(12) United States Patent
Shrivastava et al.

(10) Patent No.: US 8,654,491 B2
(45) Date of Patent: Feb. 18, 2014

(54) LOW VOLTAGE ESD CLAMPING USING HIGH VOLTAGE DEVICES

(75) Inventors: Mayank Shrivastava, Unterhaching (DE); Christian Russ, Diedorf (DE); Harald Gossner, Riemerling (DE)

(73) Assignee: Intel Mobile Communications GmbH, Neubiberg (DE)

( * ) Notice: Subject to any disclaimer, the term of this patent is extended or adjusted under 35 U.S.C. 154(b) by 0 days.

(21) Appl. No.: 13/437,475

(22) Filed: Apr. 2, 2012

(65) Prior Publication Data

US 2013/0258534 A1 Oct. 3, 2013

(51) Int. Cl.
*H02H 3/22* (2006.01)

(52) U.S. Cl.
USPC ............................................. 361/56; 361/111

(58) Field of Classification Search
USPC ................................................... 361/56, 111
See application file for complete search history.

(56) References Cited

U.S. PATENT DOCUMENTS

| | | | |
|---|---|---|---|
| 6,066,879 A * | 5/2000 | Lee et al. | 257/355 |
| 6,071,768 A | 6/2000 | Duvvury et al. | |
| 6,140,683 A | 10/2000 | Duvvury et al. | |
| 6,147,538 A | 11/2000 | Andresen et al. | |
| 6,411,480 B1 | 6/2002 | Gauthier et al. | |
| 6,624,487 B1 | 9/2003 | Kunz et al. | |
| 6,661,273 B1 | 12/2003 | Lai et al. | |
| 6,804,095 B2 | 10/2004 | Kunz et al. | |
| 6,900,969 B2 | 5/2005 | Salling et al. | |
| 6,933,567 B2 | 8/2005 | Duvvury et al. | |
| 7,245,466 B2 * | 7/2007 | Steinhoff | 361/56 |
| 7,295,411 B2 | 11/2007 | Arai et al. | |
| 7,633,731 B1 | 12/2009 | So | |
| 7,838,924 B2 | 11/2010 | Boselli et al. | |
| 7,872,840 B1 * | 1/2011 | Vashchenko et al. | 361/56 |
| 8,320,091 B2 | 11/2012 | Salcedo et al. | |
| 2003/0011949 A1 | 1/2003 | Ker et al. | |
| 2003/0213995 A1 | 11/2003 | Duvvury et al. | |
| 2004/0212936 A1 | 10/2004 | Salling et al. | |
| 2006/0087781 A1 | 4/2006 | Ishizuka et al. | |
| 2008/0128816 A1 | 6/2008 | Lai | |
| 2009/0267154 A1 | 10/2009 | Boselli et al. | |
| 2010/0006890 A1 * | 1/2010 | Wijmeersch | 257/140 |
| 2011/0063765 A1 | 3/2011 | Boselli et al. | |
| 2011/0241731 A1 | 10/2011 | Russ | |

OTHER PUBLICATIONS

U.S. Appl. No. 13/429,577, filed Mar. 26, 2012, 19 Pages.
Office Action dated Jun. 18, 2013 for U.S. Appl. No. 13/429,577.

* cited by examiner

*Primary Examiner* — Danny Nguyen
(74) *Attorney, Agent, or Firm* — Eschweiler & Associates, LLC

(57) ABSTRACT

Some embodiments relate to an electrostatic discharge (ESD) protection device. The ESD protection device includes a first electrical path extending between the first and second circuit nodes and including a trigger element. A second electrical path extends between the first and second circuit nodes. The second electrical path includes a shunt element. A switching element is configured to trigger current flow through the shunt element based on both a state of the trigger element and a state of the switching element.

24 Claims, 9 Drawing Sheets

LOW VOLTAGE ESD CLAMPING USING HIGH VOLTAGE DEVICES

BACKGROUND

An electrostatic discharge (ESD) pulse is a sudden and unexpected voltage and/or current discharge that transfers energy to an electronic device from an outside body, such as from a human body for example. ESD pulses can damage electronic devices, for example by "blowing out" a gate oxide of a transistor in cases of high voltage or by "melting" an active region area of a device in cases of high current, causing junction failure.

As will be appreciated in greater detail below, the present disclosure relates to improved ESD protection techniques that can more robustly divert power of impingent ESD events in a smaller circuit footprint than conventional techniques.

DETAILED DESCRIPTION

Figure 1A:
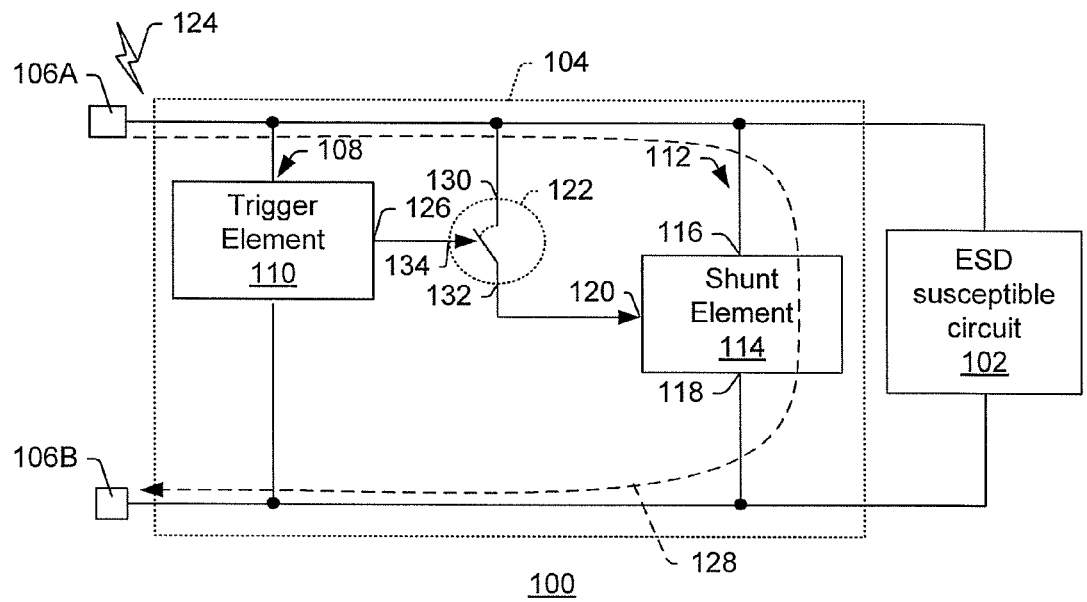
FIG. 1A shows an ESD protection device having a trigger element and a switching element that collectively trigger a shunt element in accordance with some embodiments.

The present invention will now be described with reference to the attached drawing figures, wherein like reference numerals are used to refer to like elements throughout, and wherein the illustrated structures and devices are not necessarily drawn to scale.

FIG. 1A shows an exemplary circuit 100 that includes electrostatic discharge (ESD) susceptible circuit 102 and ESD protection circuit 104, both of which are electrically coupled to first and second circuit nodes 106A, 106B. The circuit 100 can be made of discrete components or can be an integrated circuit, and includes the first and second circuit nodes 106A, 106B (e.g., a DC supply voltage pin and Ground pin, respectively). The ESD protection circuit 104 includes a first electrical path 108 which extends between the first and second circuit nodes 106A, 106B, and which includes a trigger element 110 arranged thereon. A second electrical path 112 also extends between the first and second circuit nodes 106A, 106B and is in parallel with the first electrical path 108. The second electrical path 112 includes a shunt element 114, such as a silicon controlled rectifier (SCR) or insulated gate bipolar transistor (IGBT) as described further herein for example. The shunt element 114 has a first shunt terminal 116 coupled to the first circuit node 106A, a second shunt terminal 118 coupled to the second circuit node 106B, and a third shunt terminal 120 coupled to a substrate region in the shunt element 114. A switching element 122 has a first switch terminal 130 coupled to the first circuit node 106A, a second switch terminal 132 coupled to the substrate region via the third shunt terminal 120, and a control terminal 134 coupled to an output of the trigger element 110.

In some embodiments, such as embodiments where the shunt element 114 is a silicon controlled rectifier (SCR) for example, a voltage applied to the third shunt terminal 120 determines whether power flow is enabled or disabled between the first and second shunt terminals 116, 118. For example, if the voltage applied to the substrate region in shunt element 114 via third shunt terminal 120 is greater than a trigger voltage of the SCR or shunt element 114, the SCR or shunt element 114 can allow current to flow between first and second shunt terminals 116, 118, thereby diverting an impingent ESD pulse from reaching ESD susceptible circuit 102 as shown by arrow 128. In some embodiments, such as embodiments where the shunt element 114 is an insulated gate bipolar transistor (IGBT) for example, a voltage applied to the well region via third shunt terminal 120 in the shunt element 114 can enhance the gain and current flow through the shunt element 114 well beyond that of conventional devices, as will be appreciated in more detail further herein. Again, this helps to efficiently divert an impingent ESD pulse away from ESD susceptible circuit 102 as shown by arrow 128.

Figure 1B:
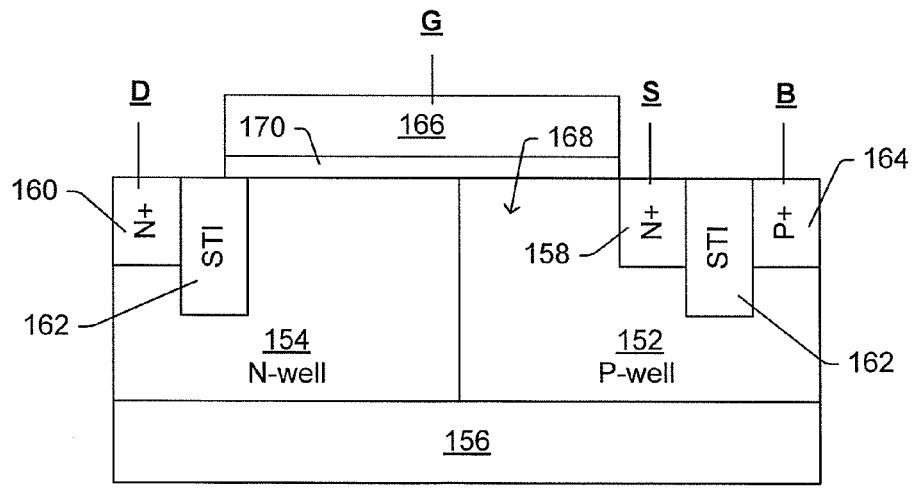
FIG. 1B shows a cross-section of an example where a switching element is implemented as a DeNMOS device in accordance with some embodiments.

FIG. 1B shows a cross-section of an exemplary drain extended metal oxide semiconductor (DeMOS) device 150 which can be used as a switching element 122 in accordance with some embodiments. The DeMOS device 150, which is an n-type DeMOS device (DeNMOS) in FIG. 1B's example, includes source 158, drain 160 (e.g., N+ regions), body region 152 (e.g., p-well region), and drain-extension region 154 (e.g., n-well region) disposed within a semiconductor substrate 156. Shallow trench isolation (STI) regions 162 and a body contact region 164 (e.g., P+ region) are also formed over the drain extension region 154 disposed within the semiconductor substrate 156. A conductive electrode 166 is formed over a channel region 168 disposed between the source 158 and drain 160. The conductive electrode 166 is electrically isolated from the channel region 168 via a gate dielectric 170.

During operation, a conductive channel is selectively formed in channel region 168, depending on whether voltage between conductive electrode 166 and source 158 is greater than or less than a threshold voltage of DeNMOS 150. If this voltage is greater than the threshold voltage, the channel region 168 is conductive, and charge carriers can flow from the source 158, through the channel region 168, through the drain-extension region 154 into the drain 160. Thus, the drain-extension region 154 can act as a resistor in some regards to help to drop large voltages, reduce hot carrier effects, and the like. In this way, FIG. 1B's DeMOS 150 facilitates reliable operation when included in an ESD protection circuits. In the following figures, a DeMOS device, such as DeNMOS device 150 shown in FIG. 1B for example, is used as a switching element (e.g., 122 in FIG. 1A). However, it will be appreciated that other switching elements (e.g., MOSFETs, BJTs) could be used in other un-illustrated embodiments.

FIGS. 2A-2D show an example of an electrostatic discharge (ESD) protection circuit 200 where shunt element (e.g., 114 of FIG. 1) takes the form of a silicon controlled rectifier (SCR) 202. The SCR 202 includes a cathode 204, anode 206, and p-trigger tap 208. The anode 206 is coupled to the first circuit node 106A, and the cathode 204 is coupled to the second circuit node 106B. The p-trigger tap 208, which constitutes a substrate region (in this example a well region) in the SCR, is coupled to a source region of drain extended n-type metal oxide semiconductor (DeNMOS) device 210.

In the absence of an ESD pulse 124, the trigger element 110 remains off and correspondingly provides a low voltage at its output 126. This low voltage, which is less than a threshold voltage $V_{TH}$ of DeNMOS transistor 210, generates in the DeNMOS transistor 210 a non-conducting, high impedance state. Thus, as long as no ESD pulse is present, the second source of DeNMOS 210 is floating and SCR 202 remains in a high-impedance or "blocking" state. During this time, normal operating voltages on first and second circuit nodes 106A, 106B flow to the ESD susceptible circuit 102. For example, if the first circuit node 106A carries a 5-volt DC supply voltage and the second circuit node 106B carries a 0-volt DC supply voltage, the ESD susceptible circuit 102 will see a 5V bias voltage in the absence of an ESD pulse 124 and will operate in its intended way.

When an ESD pulse is impingent for a positive ESD voltage relative to ground, however, the trigger element 110 detects the ESD pulse 124 and increases the voltage on output 126 above $V_{TH}$ of DeNMOS 210, thereby putting DeNMOS transistor 210 in a conductive state and coupling p-trigger tap 208 to first circuit node 106A (e.g., 5 Volt DC supply voltage pin). The coupling of the first circuit node 106A to p-trigger tap 208 causes SCR 202 to conduct current. Thus, power of the impingent ESD pulse 124 passes through the SCR 202 and along low impedance path shown by arrow 128. In this way, the power of ESD pulse 124 is diverted away from the ESD susceptible circuit 102, which has a relatively large impedance, thereby preventing damage to the ESD susceptible circuit 102.

Figure 2A:
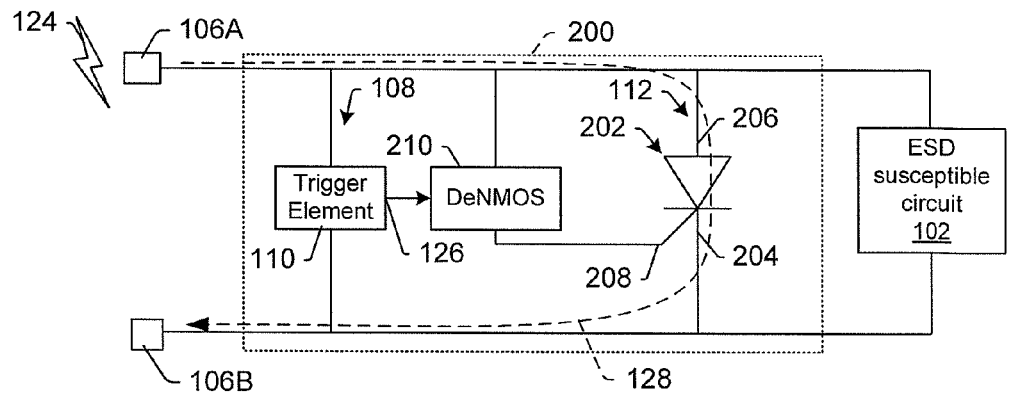
FIG. 2A-2D show examples where a shunt element takes the form of a silicon controlled rectifier (SCR) in accordance with some embodiments.
Figure 2B:
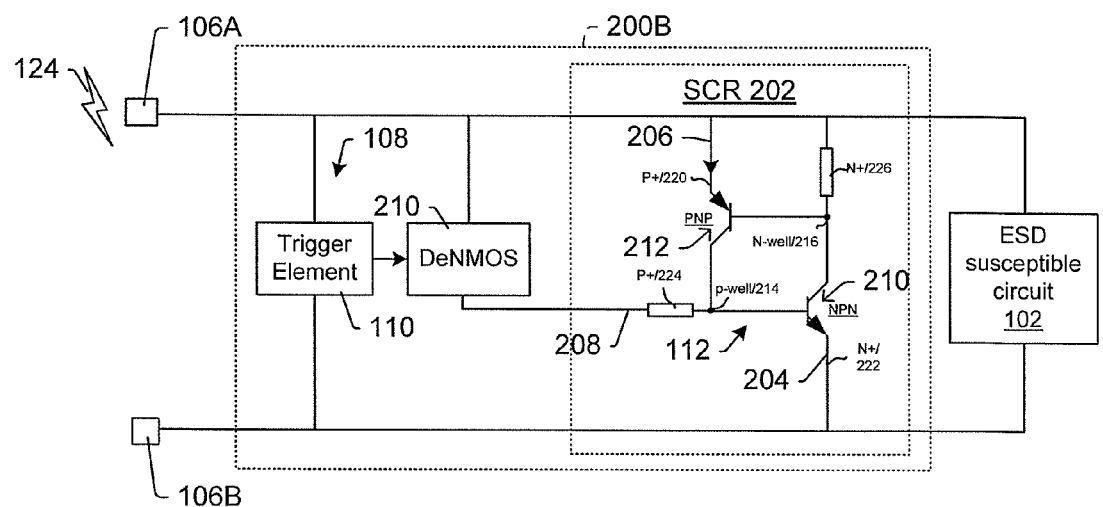
Figure 2C:
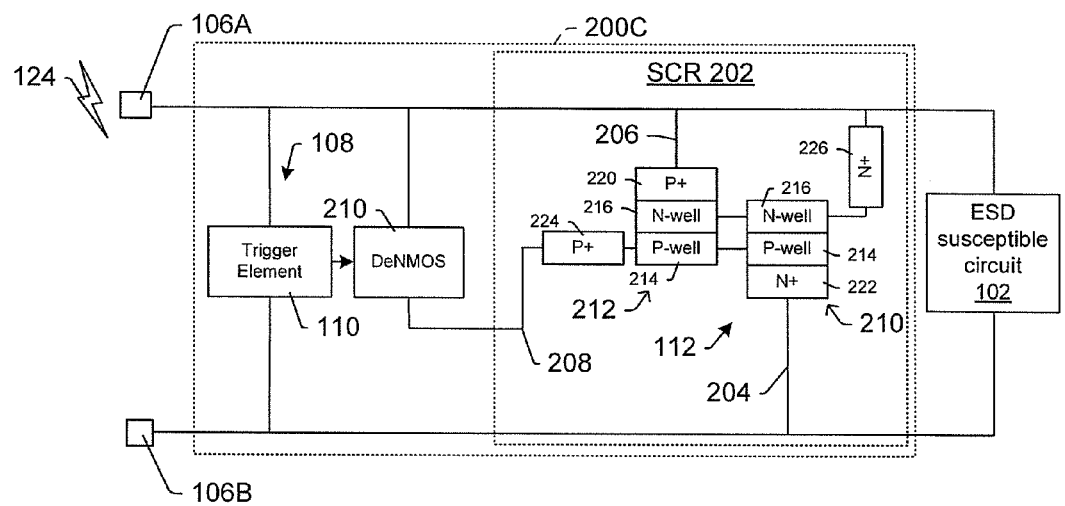
Figure 2D:
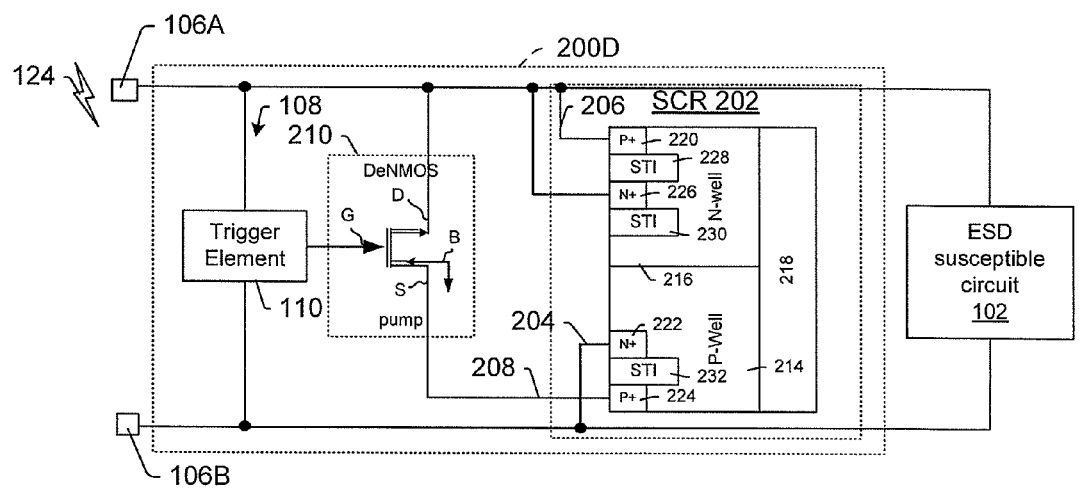

FIGS. 2B-2C show schematic views for exemplary SCRs 202B, 202C, respectively, such as SCR 202. The SCR 202B includes a pair of tightly coupled bi-polar junction transistors (BJTs); namely, a NPN transistor 210 and a PNP transistor 212. FIGS. 2B-2C are functionality equivalent, although the structural details of their particular layouts or cross-sections when manufactured may vary somewhat depending on the fabrication process employed. FIG. 2D shows one example cross-sectional view of SCR 202D, which can be equivalent to FIGS. 2A-2C. The SCR 202D includes first well region 214 having a first conductivity type (e.g., p-well) and a second well region 216 having a second conductivity type (e.g., n-well). First and second well regions 214, 216 are formed in a semiconductor substrate 218. A first shallow implant region 220 (e.g., P+) can act as an anode 206, and a second shallow implant region 222 (e.g., N+) can act as a cathode 204. A third shallow implant region 224 (e.g., P+) acts as a contact to the first well region 214; and a fourth shallow implant region 226 (e.g., N+) acts as a contact to the second well region 216. First, second, and third shallow trench isolation (STI) regions 228, 230, 232 are also disposed within the semiconductor substrate 218.

It will be appreciated that the doping conductivities in FIG. 2D can be "flipped". For example, N+ shallow implant region and P+ shallow implant regions can be switched in conjunction with n-well and p-well regions. The same is true of other—cross-sectional schematic and cross-sectional embodiments described herein. Further, depending on the polarity of ESD pulses that are expected to be encountered, the type of the doping conductivities in FIGS. 2A-2D can also be flipped. For example, in some implementations to protect against negative ESD pulses (measured with respect to ground), the direction of SCR 202 could be flipped, and so on.

Figure 3A:
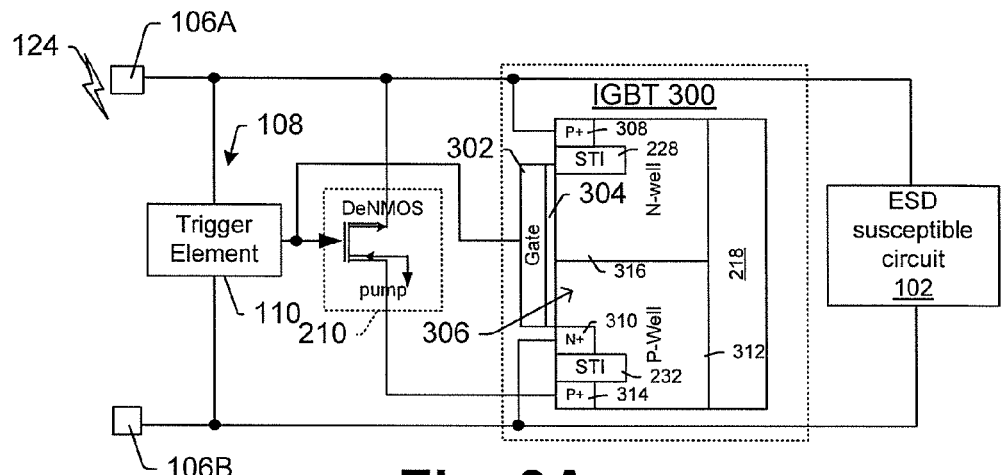
FIG. 3A shows an example where a shunt element takes the form of an insulated gate bipolar transistor (IGBT).

FIG. 3A shows an example where, relative to FIG. 2D, a gate electrode 302 has been added and fourth shallow implant region (226 in FIG. 2D) has been removed, such that shunting element (e.g., 114 in FIG. 1) now takes the form of an insulated gate bipolar transistor (IGBT) 300. A gate dielectric 304 electrically isolates the gate electrode 302 from a channel region 306 in the first well region 312 disposed within the semiconductor substrate 218. The first shallow implant region 308 can now act as an IGBT anode, and second shallow implant region 310 can now act as an cathode, which is formed in first well region 312. A third shallow implant region 314 acts as a contact to the first well region 312, while a second well region 316 is floating. First and third shallow trench isolation (STI) regions 228, 232 are also disposed in the substrate 218.

Figure 3B:
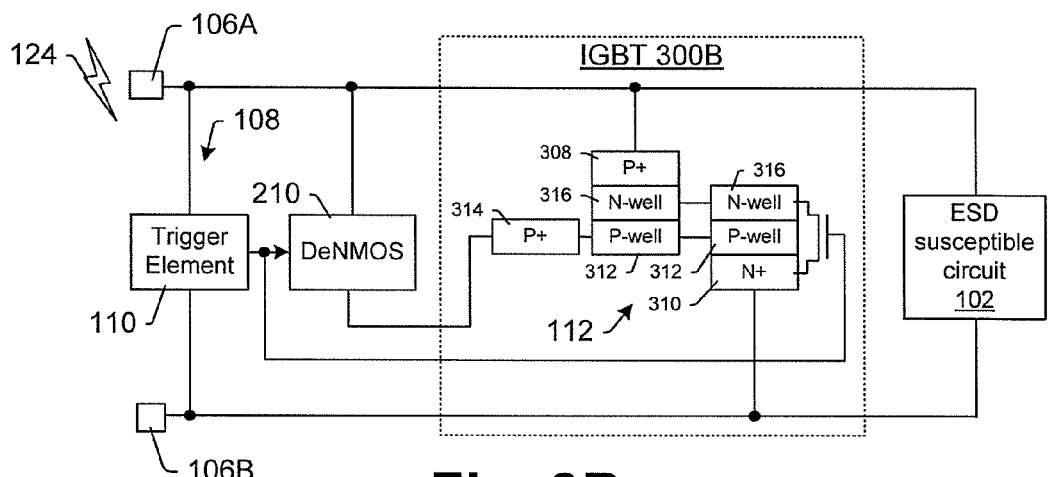
FIGS. 3B-3C show circuit schematics corresponding to FIG. 3A's example.
Figure 3C:
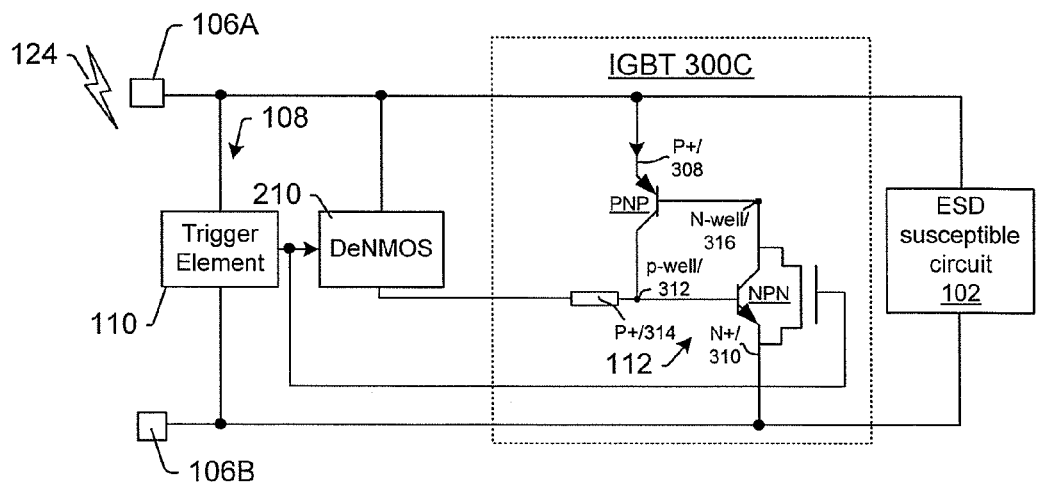

FIGS. 3B-3C show schematics consistent with FIG. 3A. Thus, FIG. 3B illustrates the functional electrical connections 300B between FIG. 3A's semiconductor regions in IGBT 300, and FIG. 3C illustrates a corresponding circuit schematic 300C for FIG. 3B. Although FIGS. 3B-3C are functionality equivalent to FIG. 3A, the structural details of their particular layouts or cross-sections when manufactured may vary somewhat from FIG. 3A depending on the fabrication process employed.

During operation of FIG. 3A's circuit, the trigger element 110 asserts a voltage pulse when ESD pulse 124 is detected. This high voltage pulse is applied to the gate electrode 302, which forms a conductive channel in channel region 306. This conductive channel is by itself insufficient to allow current flow between anode 308 and cathode 310, however, a pair of BJTs is included in the IGBT 300. The trigger signal also causes a conductive channel to be formed in DeNMOS 210, which in turn couples the p-well 312 to the first circuit node 106A (e.g., DC supply voltage). This "pumping" of the IGBT p-well 312 activates the BJTs in the IGBT 300 and shunts the power of the impingent ESD pulse 124 through the IGBT 300 and away from the ESD susceptible circuit 102.

Figure 4A:
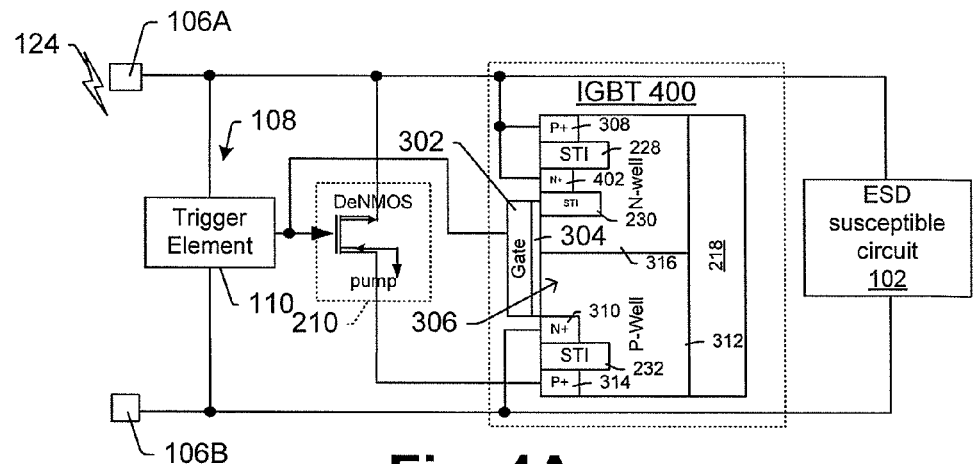
FIG. 4A shows an example where an N+ region in N-well is added to the IGBT of FIG. 3A to implement an SCR IGBT shunting element.

FIG. 4A shows an example where, relative to FIG. 3A's example, a fourth shallow implant region 402 (e.g., N+), which acts as a contact to second well region 316, has been added. An additional shallow trench isolation (STI) region 404 has also been added. FIG. 4A's insulated gate bipolar transistor (IGBT) 400 operates in much the same way as FIG. 3A's IGBT 300, except that the n-well 316 is actively biased instead of left floating as in FIG. 3A. Like FIG. 3A's embodiment, the trigger element 110 asserts a high voltage pulse when an electrostatic discharge (ESD) pulse 124 is detected. This high voltage pulse is applied to the gate electrode 302, which forms a conductive channel in channel region 306. The trigger signal also causes a conductive channel to be formed in drain-extended n-type metal oxide semiconductor (DeN-MOS) 210, which in turn couples the p-well 312 to the first circuit node 106A (e.g., DC supply voltage). This "pumping" of the IGBT p-well 312 activates the bipolar junction transistors (BJTs) and shunts the power of the impingent ESD pulse 124 through the IGBT 300 and away from the ESD susceptible circuit 102.

Figure 4B:
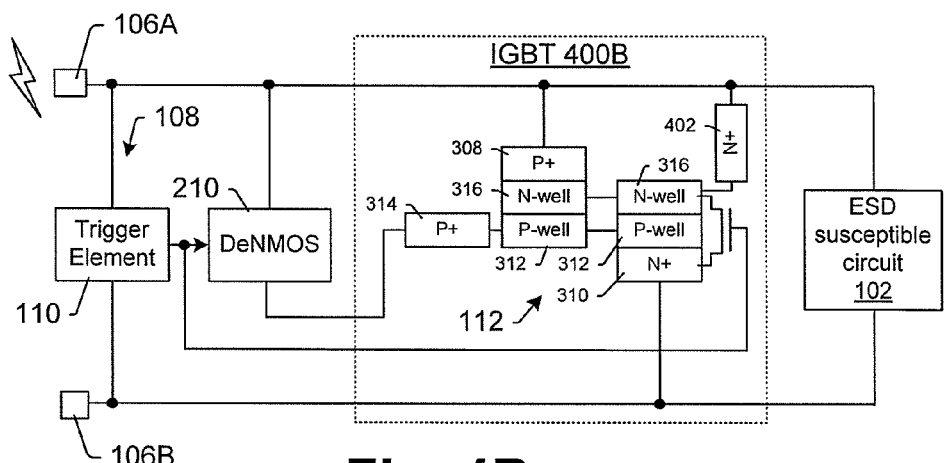
FIGS. 4B-4C show circuit schematics corresponding to FIG. 4A's example.
Figure 4C:
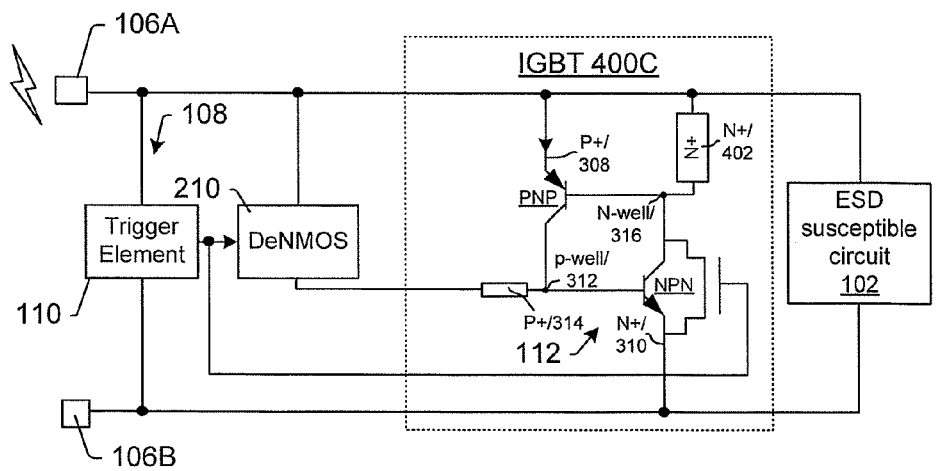

FIGS. 4B-4C show schematics consistent with FIG. 4A. Thus, FIG. 4B illustrates the functional electrical connections 400B between FIG. 4A's semiconductor regions in IGBT 400, and FIG. 4C illustrates a corresponding circuit schematic 400C for FIG. 4B. Although FIGS. 4B-4C are functionality equivalent to FIG. 4A, the structural details of their particular layouts or cross-sections when manufactured may vary somewhat from FIG. 4A depending on the fabrication process employed.

Figure 5A:
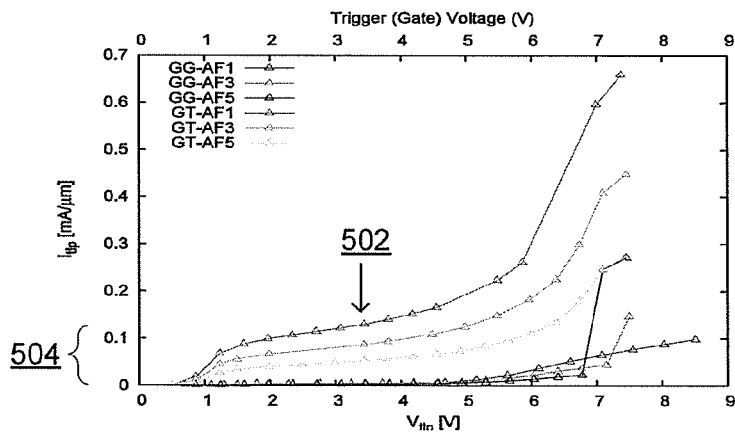
FIGS. 5A-5B show I-V characteristics of conventional ESD techniques that suffer from low gain and relatively low current handing capability.
Figure 5B:
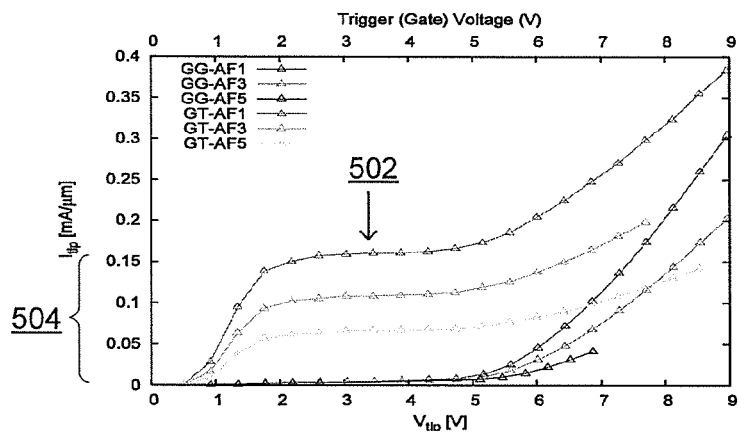
Figure 5C:
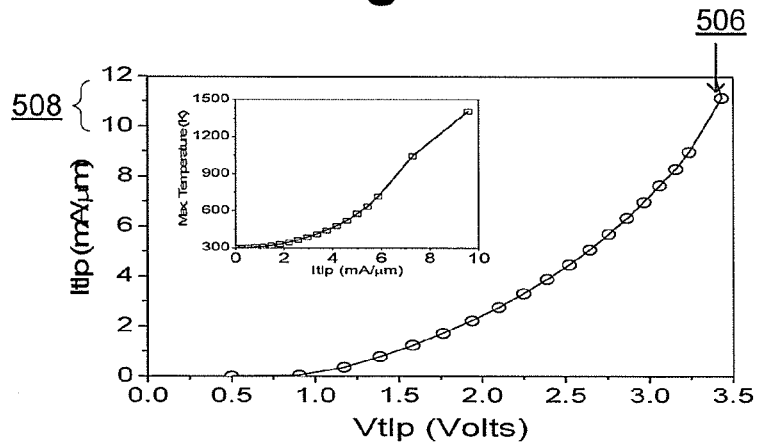
FIG. 5C shows I-V characteristics of an ESD device in accordance with some embodiments.

Relative to conventional approaches, FIG. 4A's arrangement is advantageous in that the p-well "pumping" can significantly improve the gain of the BJTs in IGBT, and hence, can more efficiently divert power of impingent ESD pulse 124, particularly when circuit 102 is designed to operate at low voltages (e.g., less than 5V). FIGS. 5A-5B show current-voltage (I-V) characteristics for conventional electrostatic discharge (ESD) devices, which suffer from low gain and low current handling ability at low voltages. For example, for low-voltage clamping with gate voltages of about 3.5V in FIGS. 5A-5B (see numeral 502), the failure current for the ESD device is in the range of approximately 0.1 mA/µm-0.2 mA/µm (see numeral 504). In contrast, FIG. 5C, which shows I-V characteristics for an ESD circuit 300 as described in FIG. 3A, the failure current for a 3.5V gate voltage (see numeral 506) is approximately 10 mA/µm (see numeral 508), which represents an increase of approximately fifty times in current handling capability in the low-voltage context. In many applications, designing for ESD currents of 10 mA/µm leads to very area-efficient ESD device solutions, and in such applications the footprint of the ESD devices can instead be reduced (e.g., by a factor of approximately 50). Hence, FIG. 4A's embodiment can be implemented in a variety of ways to provide a good balance in terms of improved current handling capability and reduced circuit footprint, compared to conventional solutions.

Figure 6A:
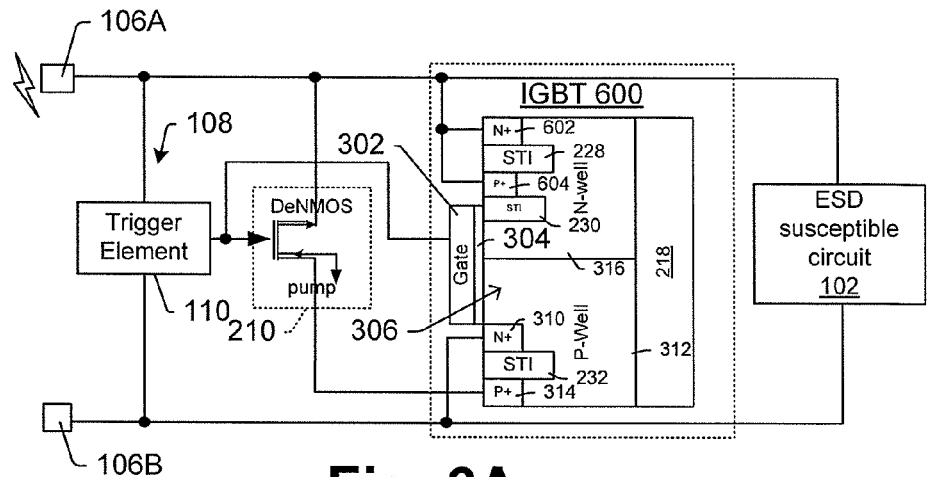
FIG. 6A shows an example where an N+ IGBT region is swapped with a P+ IGBT region, relative to FIG. 4A.
Figure 6B:
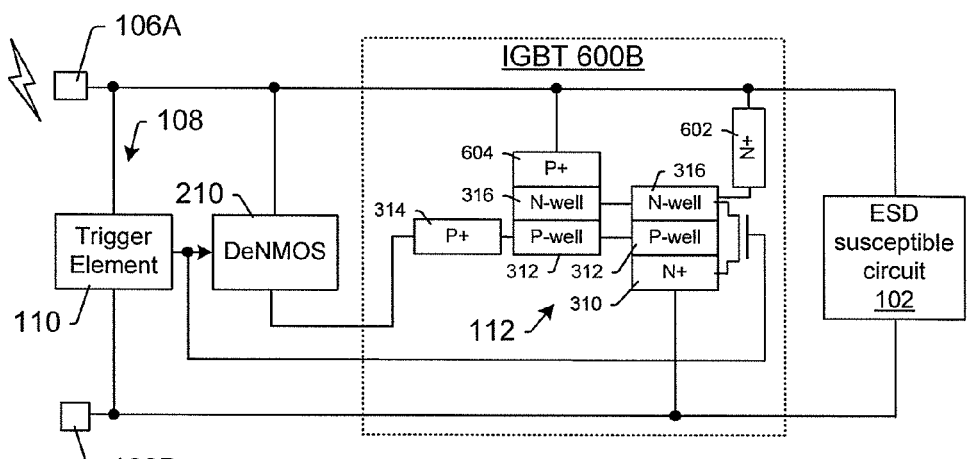
FIGS. 6B-6C show circuit schematics corresponding to FIG. 6A's example.
Figure 6C:
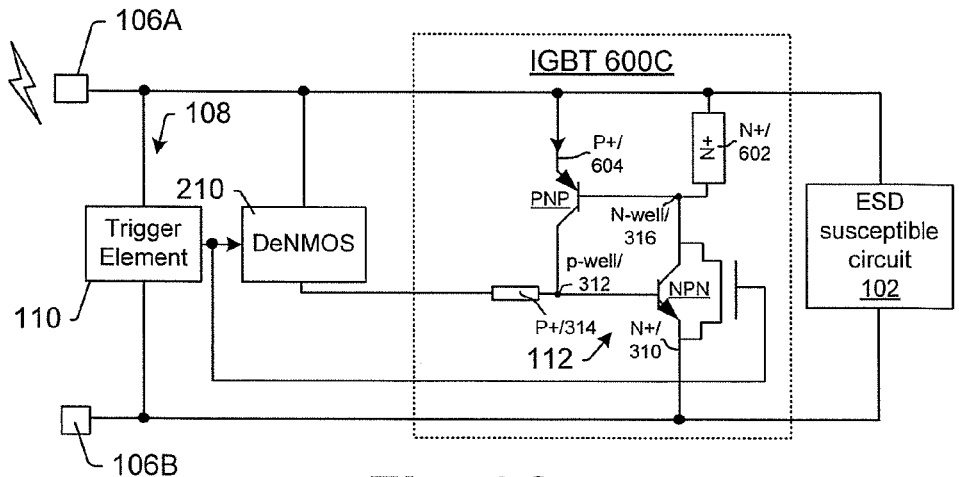

FIG. 6A shows an exemplary embodiment of an electrostatic discharge (ESD) protection circuit including an insulated gate bipolar transistor (IGBT) 600, where first and second shallow implant regions 602, 604 (N+, P+, respectively) are swapped relative to FIG. 4A. Functionality is substantially the same as described in FIG. 4A. FIGS. 6B-6C show schematics consistent with FIG. 6A. Thus, FIG. 6B illustrates the functional electrical connections 600B between FIG. 6A's semiconductor regions in IGBT 600, and FIG. 6C illustrates a corresponding circuit schematic 600C for FIG. 6B. Although FIGS. 6B-6C are functionality equivalent to FIG. 6A, the structural details of their particular layouts or cross-sections when manufactured may vary somewhat from FIG. 6A depending on the fabrication process employed.

Figure 7A:
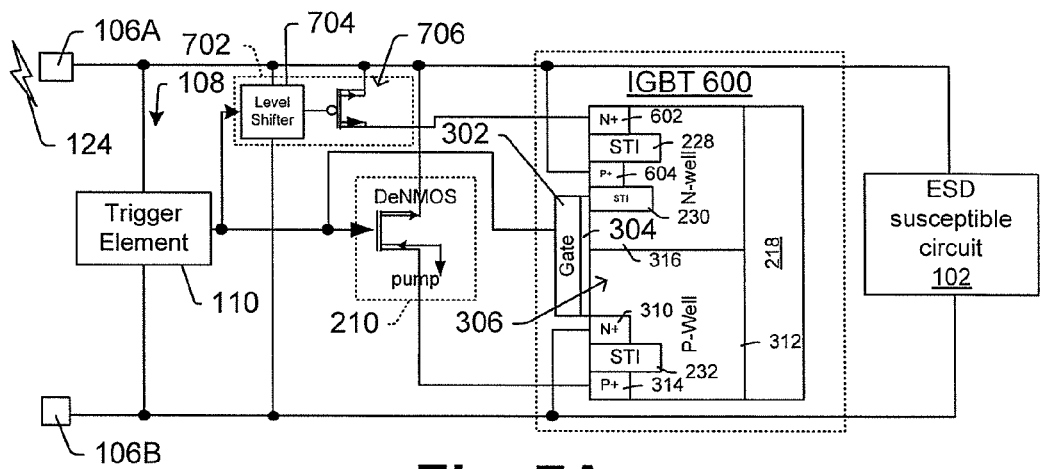
FIG. 7A shows an example where a latch-up protection circuit has been added, relative to the embodiment of FIG. 6A.

FIG. 7A shows an example of an electrostatic discharge (ESD) protection device that includes latch-up protection circuit 702. The latch-up protection circuit 702 includes a level shifter 704 and a drain extended p-type metal oxide semiconductor (DePMOS) transistor 706 (which may also be referred to as a secondary switching element). The level shifter 704 has an input terminal coupled to output of trigger element 110, and has an output coupled to an input terminal of DePMOS 706. DePMOS 706 has a source coupled to the first circuit node 106A and a drain coupled to N+ region 602. For purposes of illustration, FIG. 7A's embodiment is illustrated with the insulated gate bipolar transistor (IGBT) 600 described with respect to FIG. 6A, although other IGBT configurations could also be used.

During operation, the level shifter shifts an input signal having a first voltage range (e.g., 0 V logic low and 1.2V logic high) to a second, higher voltage range (e.g., 3.8 V logic low and 5.0 V logic high). This is used in order to comply with reliability constraints where, for example, the gate-source voltage should not exceed 1.2V (abs). the DePMOS 706 is configured to selectively couple a second IGBT well region 316 to the first circuit node 106A based on whether a voltage level on the output of the level shifter circuit 704 has a predetermined relationship with a voltage threshold of the DePMOS 706. For example, in the absence of an ESD pulse, the level shifter 704 provides a low voltage at its output, which turns DePMOS 706 on. This couples the n-well 316 to the first circuit node 106A (e.g., DC supply voltage) to limit the likelihood of latchup. In contrast, when an ESD pulse 124 is impingent, the trigger element 110 increases the voltage at its output, and the level shifter 704 correspondingly increases its output voltage. This turns off the DePMOS 706 such that the IGBT 700 acts like a silicon controlled rectifier (SCR) to efficiently divert the energy of the ESD pulse 124 away from the ESD susceptible circuit.

Figure 7B:
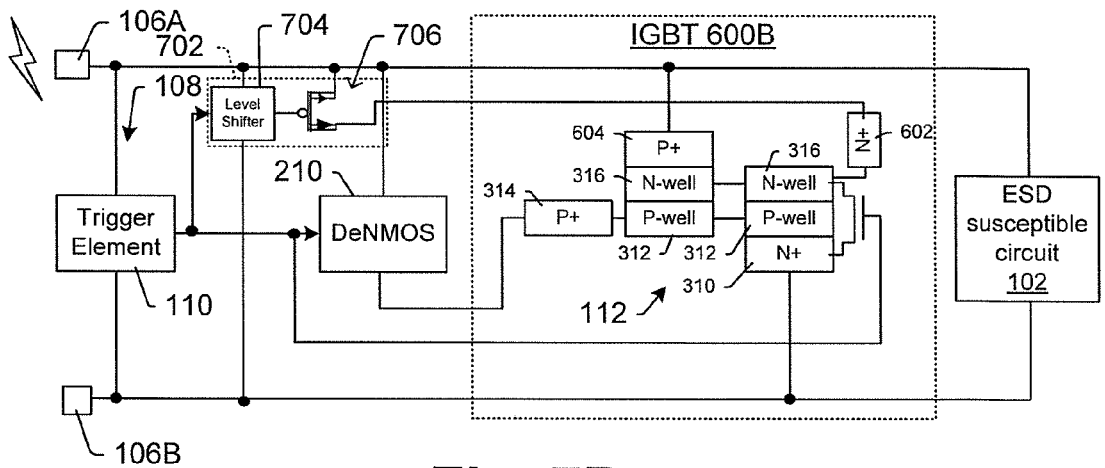
FIGS. 7B-7C show circuit schematics corresponding to FIG. 7A's example.
Figure 7C:
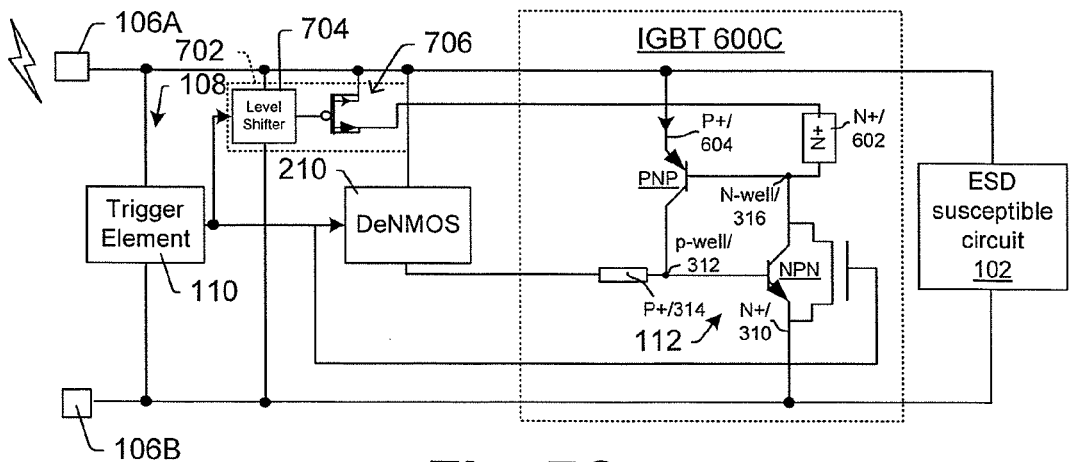

FIGS. 7B-7C show schematics consistent with FIG. 7A. Thus, FIG. 7B illustrates the functional electrical connections 600B between FIG. 7A's semiconductor regions in IGBT 700, and FIG. 7C illustrates a corresponding circuit schematic 600C for FIG. 7B. Although FIGS. 7B-7C are functionality equivalent to FIG. 7A, the structural details of their particular layouts or cross-sections when manufactured may vary somewhat from FIG. 7A depending on the fabrication process employed. Also although latch-up protection circuit 702 is illustrated in the context of FIGS. 7A-7C, it will be appreciated that latch-up protection circuit can be used in combination with any of the other embodiments described or illustrated herein, and is not limited to FIG. 7A-7C.

Figure 8:
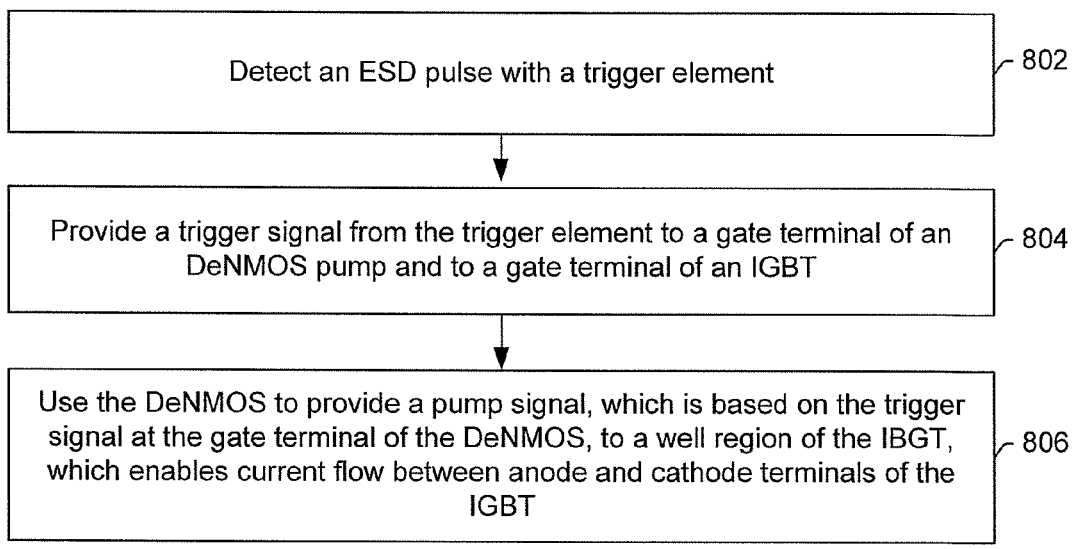
FIG. 8 shows a method in flowchart format in accordance with some embodiments.

FIG. 8 shows a method for electrostatic discharge (ESD) protection using an insulated gate bipolar transistor (IGBT) device in accordance with some embodiments.

At 802, a trigger element, such as an RC trigger element, detects an electro-static discharge (ESD) pulse, which is impingent towards an ESD susceptible circuit.

At 804, a trigger element provides a trigger signal to a gate terminal of the IGBT and to a gate terminal of a drain extended n-type metal oxide semiconductor (DeNMOS) pump transistor. For example, if an ESD pulse is detected, a voltage of the trigger signal can be increased to correspond to activation of the trigger signal. Conversely, if no ESD pulse is detected, the voltage of the trigger signal can remain constant (e.g., low).

At 806, the DeNMOS pump provides a pump signal, which is based on the trigger signal, to a well region of the IBGT. The pump signal can enable current flow between an anode and cathode of the IGBT, thereby diverting power of the ESD pulse away from the ESD susceptible circuit. In many cases, the trigger signal and pump signal can be provided concurrently.

Thus it will be appreciated that some embodiments relate to an electrostatic discharge (ESD) protection device to protect a circuit from an ESD event. The circuit is electrically connected to first and second circuit nodes. The ESD protection device includes a first electrical path extending between the first and second circuit nodes and including a trigger element arranged thereon. A second electrical path extends between the first and second circuit nodes and is in parallel with the first electrical path. The second electrical path includes a shunt element having a first shunt terminal coupled to the first circuit node, a second shunt terminal coupled to the second circuit node, and a first well region. A switching element includes a control terminal coupled to an output of the trigger element, a first switch terminal coupled to the first circuit node, and a second switch terminal coupled to the first well region.

Some embodiments relate to an electrostatic discharge (ESD) protection device. The ESD protection device includes a trigger element to detect an ESD pulse, and a switching element. The switching element includes a first switch terminal, a second switch terminal, and a control terminal. The control terminal is coupled to an output of the trigger element and controls current flow between the first and second switch terminals. The ESD protection device also includes an insulated gate bipolar transistor (IGBT), which has a gate coupled to an output of the trigger element and a first well region coupled to the second switch terminal.

Some further embodiments relate to a method for ESD protection using an insulated gate bipolar transistor (IGBT). In the method, an electro-static discharge (ESD) pulse, which is impingent towards an ESD susceptible circuit, is detected. A trigger signal is selectively activated based on detection of the ESD pulse, and is provided to a gate terminal of the IGBT. A pump signal, which is based on the trigger signal, is provided to a well region of the IBGT to enable current flow between an anode and cathode of the IGBT and thereby divert power of the ESD pulse away from the ESD susceptible circuit.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. An electrostatic discharge (ESD) protection device comprising:
    a first electrical path extending between a first circuit node and a second circuit node and including a trigger element;
    a second electrical path extending between the first circuit node and the second circuit node, the second electrical path including a shunt element; and
    a switching element configured to trigger current flow through the shunt element based on both a state of the trigger element and a state of the switching element;
    wherein the switching element comprises a drain extended MOS transistor having a gate coupled to an output of the trigger element, a drain region coupled to the first circuit node, and a source region coupled to a first well of the shunt element.

2. The ESD protection device of claim 1, wherein the first well is a p-well.

3. The ESD protection device of claim 1, wherein the shunt element comprises a silicon controlled rectifier (SCR).

4. The ESD protection device of claim 3, wherein the SCR comprises:
    an anode coupled to the first circuit node;
    a cathode coupled to the second circuit node; and
    a trigger tap corresponding to the first well of the shunt element.

5. The ESD protection device of claim 1, wherein the shunt element comprises an insulated gate bipolar transistor (IGBT).

6. The ESD protection device of claim 5, wherein the IGBT comprises:
    a gate coupled to an output of the trigger element;
    an anode coupled to the first circuit node; and
    a cathode coupled to the second circuit node.

7. The ESD protection device of claim 6, wherein the IGBT includes a first well having a well contact.

8. The ESD protection device of claim 7, wherein the first well is a p-well.

9. The ESD protection device of claim 1 wherein the shunt element comprises:
    a first shallow implant region disposed in a second well comprising an n-well, wherein the first shallow implant region has a p-type conductivity and constitutes a first shunt terminal of the shunt element; and
    a second shallow implant region disposed in the first well region and spaced apart from the first shallow implant region, wherein the second shallow implant region has an n-type conductivity and wherein the second shallow implant constitutes a second shunt terminal of the shunt element.

10. The ESD protection device of claim 9, further comprising:
    a first STI region adjacent to the first shallow implant region; and
    a third shallow implant region adjacent to the first STI region, wherein the first STI region is between the first and third shallow implant regions.

11. The ESD protection device of claim 9 wherein the shunt element further comprises:
    a gate electrode disposed over the first well and second well; and
    a gate dielectric disposed between the gate electrode and the first well.

12. The ESD protection device of claim 11, further comprising:
    a first STI region adjacent to the first shallow implant region;
    a third shallow implant region adjacent to the first STI region, wherein the first STI region is between the first and third shallow implant regions; and
    a second STI region adjacent to the third shallow implant region and arranged under the gate electrode.

13. An electrostatic discharge (ESD) protection device comprising:
    a first electrical path extending between a first circuit node and a second circuit node and including a trigger element;
    a second electrical path extending between the first circuit node and the second circuit node, the second electrical path including a shunt element; and
    a switching element configured to trigger current flow through the shunt element based on both a state of the trigger element and a state of the switching element; and
    a latch-up protection circuit comprising: a secondary switching element configured to selectively couple a well region of the shunt element to the first circuit node.

14. The ESD protection device of claim 13, wherein the well region is an n-well.

15. The ESD protection device of claim 13, further comprising:
a level shifter circuit having an input coupled to the trigger element and an output coupled to an input of the secondary switching element.

16. The ESD protection device of claim 13, wherein a p-well of the shunt element is coupled to the second circuit node.

17. The ESD protection device of claim 1, wherein the shunt element has a first shunt terminal coupled to the first circuit node and a second shunt terminal coupled to the second circuit node.

18. The ESD protection device of claim 1, wherein the switching element includes a control terminal coupled to an output of the trigger element, a first switch terminal coupled to the first circuit node, and a second switch terminal coupled to the first well of the shunt element.

19. An ESD protection device, comprising:
a trigger element to detect an ESD pulse;
a switching element coupled to the trigger element; and
an IGBT coupled to the trigger element and having a substrate region coupled to the switch element, wherein the IGBT is configured to selectively enable or disable current flow through the IGBT based on a state of the trigger element and a state of the switch element.

20. The ESD protection device of claim 19, wherein the IGBT further comprises:
a first shallow implant region having a first conductivity type and disposed in an n-well;
a second shallow implant region disposed in the substrate region and spaced apart from the first shallow implant region, wherein the second shallow implant region has a second conductivity type opposite the first conductivity type;
a gate electrode disposed over the substrate region between the first and second shallow implant regions; and
a gate dielectric disposed between the gate electrode and the substrate region.

21. The ESD protection device of claim 20, further comprising:
a first STI region adjacent to the first shallow implant region; and
a third shallow implant region adjacent to the first STI region, wherein the first STI region is between the first and third shallow implant regions.

22. The ESD protection device of claim 19, wherein the switching element comprises a drain-extended MOS transistor.

23. A method for ESD protection, comprising:
detecting an ESD pulse;
providing a trigger signal to a drain extended MOS device to generate a pump signal; and
providing the pump signal to a substrate region of an insulated gate bipolar transistor (IGBT) to enable current flow through the IGBT.

24. The method of claim 23, wherein the trigger signal and pump signal are applied concurrently to enable current flow between an anode and a cathode of the IGBT.

* * * * *